United States Patent [19]

Senn

[11] Patent Number: 5,389,233
[45] Date of Patent: Feb. 14, 1995

[54] METALS PASSIVATION OF CRACKING CATALYSTS

[75] Inventor: Dwayne R. Senn, Bartlesville, Okla.

[73] Assignee: Phillips Petroleum Company, Bartlesville, Okla.

[21] Appl. No.: 137,247

[22] Filed: Oct. 14, 1993

[51] Int. Cl.[6] .................... C10G 11/05; B01J 29/06
[52] U.S. Cl. .................... 208/120; 208/114; 502/25; 502/64; 502/521
[58] Field of Search ............. 502/25, 64, 521; 208/120, 114

[56] References Cited

U.S. PATENT DOCUMENTS

| | | | |
|---|---|---|---|
| 2,381,659 | 8/1945 | Frey | 502/25 |
| 4,331,563 | 5/1982 | McKay | 252/455 Z |
| 4,364,847 | 12/1982 | Tu | 252/412 |
| 4,473,463 | 9/1984 | Bertus et al. | 502/521 |
| 4,568,656 | 2/1986 | Poeppelmeier et al. | 502/74 |
| 4,595,666 | 6/1986 | Ganguli | 502/25 |
| 4,727,053 | 2/1988 | Bertus et al. | 502/521 |
| 4,793,914 | 12/1988 | Bertus et al. | 208/113 |

OTHER PUBLICATIONS

Mellor's Comprehensive Treatise On Inorganic and Theoretical Chemistry, vol. II, Supplement II, John Wiley and Sons, 1961, p. 244.

*Primary Examiner*—Carl F. Dees
*Attorney, Agent, or Firm*—K. K. Brandes

[57] ABSTRACT

A zeolite-containing cracking catalyst is passivated with lithium sulfate and, preferably, at least one additional passivating agent (more preferably at least one antimony compound). The thus-passivated cracking catalyst is employed in a process for catalytically cracking a hydrocarbon-containing oil feed. In another embodiment, lithium sulfate and, preferably, at least one additional passivating agent are added to a hydrocarbon-containing oil feed which is catalytically cracked in the presence of a zeolite-containing cracking catalyst.

26 Claims, No Drawings

METALS PASSIVATION OF CRACKING CATALYSTS

BACKGROUND OF THE INVENTION

In one aspect, this invention relates to the treatment of catalytic cracking catalysts with an alkali metal compound (so as to alleviate detrimental effects of metal deposits on the catalysts). In another aspect, this invention relates to the use of thus-treated catalysts in a catalytic cracking processes. In a further aspect, this invention relates to a process for catalytically cracking metal-containing oils with a catalyst which has been treated with an alkali metal compound.

The treatment of metal-contaminated zeolite-containing cracking catalysts with alkali metal compounds (for enhancing or restoring the activity of these catalyst and/or to increase the gasoline yield and/or to reduce hydrogen generation when these catalysts are employed in catalytic oil cracking processes) is known under the term of "metals passivation" and has been described in the patent literature (e.g., in U.S. Pat. Nos. 4,331,563, 4,364,847, 4,727,053 and 4,793,911). Also described in several of these patents are processes for catalytically cracking heavy oils to which an alkali metal compound has been added as a passivating agent. In the present invention, a specific alkali metal compound which does not, to any significant extent, thermally decompose during catalytic cracking and/or catalyst regeneration is used as a metals passivating agent.

SUMMARY OF THE INVENTION

It is an object of this invention to provide a method of treating metal-contaminated, zeolite-containing cracking catalysts with a specific alkali metal compound so as to improve the catalytic cracking performance of these catalysts. It is another object of this invention to provide a catalytic cracking process which employs the above-treated (passivated) cracking catalysts. It is a further object of this invention to carry out a catalytic cracking process employing a metal-contaminated oil feed to which a specific alkali metal compound has been added. The use of the added alkali metal compound in the present invention results in benefits attained during catalytic cracking, in particular higher gasoline yield, higher olefin yields, lower yields of undesirable aromatics, lower hydrogen generation, and less coke deposition on catalysts. Other objects and advantages will become apparent from the detailed description of the invention and the appended claims.

In accordance with this invention, a zeolite-containing catalytic cracking catalyst which contains at least one metal contaminant (particularly nickel compounds) is contacted with lithium sulfate so as to provide a passivated catalyst into which at least about 0.01 weight percent lithium (expressed as elemental Li) has been incorporated.

Also in accordance with this invention, there is provided a passivated zeolite-containing catalytic cracking catalyst into which at least about 0.01 weight percent lithium (expressed as elemental Li) has been incorporated (by the passivation method described above).

Further in accordance with this invention, there is provided a process for catalytically cracking a hydrocarbon-containing oil feed, substantially in the absence of added hydrogen gas, in the presence of a passivated zeolite-containing catalytic cracking catalyst into which at least about 0.01 weight percent lithium (expressed as elemental Li) has been incorporated (by the passivation method described above).

Still further in accordance with this invention, a process for catalytically cracking a hydrocarbon-containing oil feed, substantially in the absence of added hydrogen gas, in the presence of a zeolite-containing catalytic cracking catalyst, wherein an effective amount of lithium sulfate has been added to said oil feed so as to attain a higher gasoline yield (and generally also higher feed conversion and/or lower hydrogen generation and/or lower coke generation and/or higher isobutane yield).

In preferred features of the above-described embodiments of this invention, at least one other passivating agent (more preferably at least one antimony compound) has also been added (in addition to $Li_2SO_4$) to the catalytic cracking catalyst and/or the hydrocarbon-containing feed oil.

DETAILED DESCRIPTION OF THE INVENTION

Any zeolite-containing catalytic cracking catalyst can be used in the processes of this invention. The catalytic cracking catalyst can be a fresh (i.e., unused) material or a "spent" material (i.e., having been used in a previous process for catalytically cracking a hydrocarbon-containing oil which generally contains Ni, V and possibly other metal impurities, and having been regenerated by stream-stripping and coke burn-off) or an "equilibrium catalyst" material (i.e., a mixture of "spent" and fresh catalyst material generally containing about 90–95 weight-% of "spent" catalyst). The zeolite component of the cracking catalyst composition can be any natural or synthetic crystalline aluminosilicate zeolite which exhibits cracking activity. Non-limiting examples of such zeolites are faujasite, chabazite, mordenilte, offretire, erionite, Zeolon, zeolite X, zeolite Y, zeolite L, zeolite ZSM-4, zeolite ZSM-5, zeolite ZSM-11, zeolite ZSM-12, zeolite ZSM-23, zeolite ZSM-35, zeolite ZSM-38, zeolite ZSM-48, and the like, and mixtures thereof. Additional examples of suitable zeolites are listed in U.S. Pat. No. 4,158,621. The term "zeolite", as used herein, includes zeolites which have been pretreated, such as those from which a portion of Al has been removed from the crystalline framework, and zeolites which have been ion-exchanged with rare earth metal or ammonium or by other conventional ion-exchange methods. The term "zeolite", as used herein, also includes essentially aluminum-free silica polymorphs, such as silicalite, chromia-silicates, ferrosilicates, borosilicates, and the like, as disclosed in U.S. Pat. No. 4,556,749.

Generally, the zeolite component of the catalytic cracking catalyst composition is embedded in a suitable solid refractory inorganic matrix material, such as alumina, silica, silica-alumina (presently preferred), clay, aluminum phosphate, magnesium oxide, mixtures of two or more of the above-listed materials, and the like. The preparation of such zeolite/matrix cracking catalyst compositions is well known and is not a critical feature of this invention. Generally, the surface area (measured by nitrogen adsorption, substantially in accordance with the BET method of Brunauer, Emmett and Teller) of the zeolite/matrix cracking catalyst composition is in the range of from about 50 to about 800 $m^2/g$. Generally, the weight ratio of zeolite to matrix material in the catalytic cracking catalyst composition is in the range of from about 1:20 to about 1:1. The catalytic cracking catalyst composition comprising zeolite and matrix material can have any suitable particle size, and generally is coarser than about 200 mesh. The catalyst composition can be an extrudate or a pelletized material or an irregularly shaped material (depending on the particular type of cracking operation in which it is to be used). It is presently preferred to use catalytic cracking catalysts from which platinum is substantially absent.

The contacting of the zeolite-containing catalytic cracking catalyst with lithium sulfate in accordance with this invention can be carried out in any suitable manner. In one mode of operation, the cracking catalyst is contacted in any suitable manner (preferably by impregnation or by spraying) with a solution (or, alternatively, dispersion) which contains lithium sulfate. Generally, $Li_2SO_4$ is dissolved in a suitable solvent (which may be a water or any other liquid which dissolves a sufficient amount of $Li_2SO_4$). It is within the scope of this invention to employ treating agents in which lithium sulfate is dispersed in a liquid. The term "dispersion", as used herein, encompasses colloidal dispersions.

It is within the scope of this invention, to additionally employ at least one other metal passivating agent, such as one or two or more than two compounds of the following elements: alkaline earth metals (especially Ca, Sr, Ba), aluminum, indium, germanium, tin, phosphorus, antimony, bismuth, selenium, tellurium, zirconium, tungsten, manganese, and the like, preferably antimony. $Li_2SO_4$ and the other passivating agent(s) can be applied in any suitable manner. In one mode of operation, a first solution (or, alternatively, dispersion) containing $Li_2SO_4$ and a second solution (or, alternatively, dispersion) containing at least one other passivating agent are prepared, and the catalyst composition is then contacted with the first solution (or dispersion) and thereafter with the second solution (or dispersion), either by impregnation or by spraying or by any other suitable contacting means. Or the catalyst composition is contacted first with the second solution (or dispersion) and thereafter with the first solution (or dispersion), either by impregnation or by spraying or by any other suitable means. Or the catalyst composition is substantially simultaneously contacted (preferably sprayed) with the first solution (or dispersion) and the second solution (or dispersion). Or the catalyst composition is contacted with one solution (or dispersion) which contains $Li_2SO_4$ and at least one other passivating agent (preferably at least one antimony compound).

Any suitable concentrations of $Li_2SO_4$ and, optionally, of one other passivating agent, in the treating agents (i.e., either solutions or dispersions of the above-described compounds) can be employed. Preferably, treating agents (herein also referred to as passivating agents) contain about 0.01–0.5 mol/l Li and, if used, about 0.01–0.5 mole/l Sb (or another passivating element). Any suitable weight ratio of $Li_2SO_4$ to the catalyst composition can be applied. Generally, the weight ratio of $Li_2SO_4$ to the cracking catalyst is such as to provide a level of about 0.01–5 weight-% Li (preferably about 0.02–2 weight-% Li) in the passivated catalyst. When at least one additional passivating agent (more preferably, at least one antimony compound) is used, any suitable weight ratio of the at least one metals passivating compound (preferably at least one compound of antimony) to the cracking catalyst composition can be applied. The weight ratio of antimony metal compound(s), if used, to the cracking catalyst is such as to provide a level of at least about 0.01 weight-% Sb, preferably about 0.01–5 weight-% Sb, more preferably about 0.05–1 weight-% Sb (on an elemental basis) in the passivated catalyst. It is understood that the cracking catalyst to be passivated may already contain some Li and/or Sb and/or other passivating agents (because it is a "spent" catalyst or an "equilibrium" catalyst which has undergone previous passivation). In this case, the incorporation of smaller amounts of lithium and, optionally, of at least one other passivating agent in the present passivation process is required to attain the above-recited levels of lithium and, optionally, antimony in the passivated catalyst.

Lithium sulfate can be employed as an anhydrous compound or as a hydrate (e.g., $Li_2SO_4.H_2O$). It is within the scope of this invention (yet presently not preferred) to employ complex compounds with lithium sulfate as a component, such as $LiAl(SO_4)_2$. Any suitable antimony compound can be employed as the second passivating agent. Non-limiting examples of suitable Sb compounds are described in various patents (e.g., U.S. Pat. Nos. 3,711,422, 4,025,458, 4,190,552, 4,193,891, 4,263,131, among others). Preferred antimony compounds are antimony hydroxyhydrocarbylthiolates, such as antimony tris(2-hydroxyethylthiolate), antimony tris(O,O-dihydrocarbyl)phosphorodithiolates, antimony oxides (more preferably $Sb_2O_5$), antimony carboxylates, antimony mercaptides, antimony fluoride and mixtures thereof. Presently preferred is antimony tris(2-hydroxyethylthiolate) dissolved in a organic solvent (more preferably 2-hydroxyethyl mercaptan, also referred to as 2-hydroxyethanethiol).

The thus-treated (passivated) catalytic cracking catalyst composition, which now contains lithium and, optionally, another passivating agent (preferably at least one antimony compound), is generally dried, preferably at about 80°–120° C. for about 0.5–10 hours, and frequently also calcined, preferably at about 500°–800° C. for about 0.5–8 hours (in air or in an inert gas atmosphere, with or without added steam). If the contacting of the catalytic cracking catalyst composition with the liquid passivating solution is carried out with a hot catalyst composition (generally having a temperature of about 400°–700° C., e.g., one which is present in or exits from the oxidative regenerator of a catalytic cracking unit), separate heating (i.e., drying, calcining) steps may be omitted, because the drying occurs immediately after the contacting of the passivating agent(s) and the hot catalyst. Thus, it is within the scope of this invention to have the contacting with $Li_2SO_4$ and the drying/calcining steps occur substantially simultaneously.

In accordance with this invention, the catalytic cracking catalyst composition which has been contacted (passivated) with $Li_2SO_4$ and, optionally, at least one other passivating compound (preferably at least one antimony compound) can be used in any catalytic cracking process, i.e., a process for catalytically cracking hydrocarbon-containing oil feedstocks, in any suitable cracking reactor (e.g., in a FCC reactor or in a Thermofor moving bed reactor). The term "catalytic cracking", as used herein, implies that essentially no hydrocracking occurs and that the catalytic cracking process is carried out with a hydrocarbon-containing oil feed substantially in the absence of added hydrogen gas, under such conditions as to obtain at least one liquid product stream having a higher API gravity (measured at 60° F.) than the feed. The treated catalyst composition can be used alone or in admixture with fresh (unused) zeolite-containing catalyst composition in catalytic cracking processes.

The hydrocarbon-containing feed stream for the catalytic cracking process of this invention can be any suitable feedstock. Generally, the feed has an initial boiling point (ASTM D1160) exceeding about 400° F., and preferably has a boiling range of from about 400° to about 1200° F., more preferably a boiling range of about 500° to about 1100° F., measured at atmospheric pressure conditions. Generally, this feed contains metal impurities, particularly nickel and vanadium compounds (generally in excess of about 0.01 ppm Ni and about 0.01 ppm V). The API gravity (measured at 60° F.) generally is in the range of from about 5 to about 40, preferably from about 10 to about 35. Generally, these feedstocks contain Ramsbottom carbon residue (ASTM D524; usually about 0.1-20 weight-%), sulfur (generally about 0.1-5 weight-% S), nitrogen (generally about 0.05-2 weight-% N), nickel (generally about 0.05-30 ppm Ni, i.e., about 0.05-30 parts by weight of Ni per million parts by weight of oil feed) and vanadium (generally about 0.1-50 ppm V, i.e., about 0.1-50 parts by weight of vanadium per million parts by weight of oil feed). Small amounts (generally about 0.01-50 ppm) of other metal impurities, such as compounds of Cu, Na, and Fe may also be present in the oil feed. Non-limiting examples of suitable feedstocks are light gas oils, heavy gas oils, vacuum gas oils, cracker recycle oils (light cycle oils and heavy cycle oils), residua (such as distillation bottoms fractions), and hydrotreated residua (e.g., hydrotreated in the presence of Ni, Co, Mo-promoted alumina catalysts), liquid coal pyrolyzates, liquid products from the extraction or pyrolysis of tar sand, shale oils, heavy fractions of shale oils, and the like. The presently most preferred feedstocks are heavy gas oils and hydrotreated residua.

Any suitable reactor can be used for the catalytic cracking process of this invention. Generally, a fluidized-bed catalytic cracking (FCC) reactor (preferably containing one or more risers) or a moving-bed catalytic cracking reactor (e.g., a Thermofor catalytic cracker) is employed. Preferably, the reactor is a FCC riser cracking unit. Examples of such FCC cracking units are described in U.S. Pat. Nos. 4,377,470 and 4,424,116. Generally a catalyst regeneration unit (for removal of coke deposits) is combined with the FCC cracking unit, as is shown in the above-cited patents.

Specific operating conditions of the cracking operation greatly depend on the type of feedstock, the type and dimensions of the cracking reactor and the oil feed rate. Examples of operating conditions are described in the above-cited patents and in any other publications. In an FCC operation, generally the weight ratio of catalyst composition to oil feed (i.e., hydrocarbon-containing feed) ranges from about 2:1 to about 10:1, the contact time between oil feed and catalyst is in the range of from about 0.2 to about 2.0 seconds, and the cracking temperature is in the range of from about 800° to about 1200° F. Generally, steam is added with the oil feed to the FCC reactor so as to aid in the dispersion of the oil as droplets. Generally, the weight ratio of steam to oil feed is in the range of from about 0.05:1 to about 0.5:1.

The separation of the thus employed cracking catalyst composition from gaseous and liquid cracked products (in particular hydrocarbons) and the separation of cracked products into various gaseous and liquid product fractions can be carried out by any well known, conventional separation means. The most desirable product fraction is gasoline (ASTM boiling range: about 80°-400° F.) Non-limiting examples of such separation schemes are showing in "Petroleum Refining" by James H. Gary and Glenn E. Handwerk, Marcel Dekker, Inc., 1975.

Generally, the used cracking catalyst composition which has been separated from cracked gaseous and liquid products (e.g., in a cyclone) is then regenerated, preferably by steam-stripping for removal of adhered oil and by subsequent heating (preferably at about 1100°-1300° F.) under oxidizing conditions so as to burn off carbon deposits by conventional means. At least a portion of the regenerated cracking catalyst composition can then be treated by the catalyst treating process of this invention, described above. Thereafter, the regenerated and passivated catalyst is recycled to the catalytic cracking reactor, generally in admixture with fresh (unused) cracking catalyst.

In one preferred embodiment of this invention, the passivating agents ($Li_2SO_4$ and optionally, at least one antimony compound and/or at least one other passivating compound) are added to the hydrocarbon-containing oil feed stream before it enters the catalytic cracking reactor. The passivating agents are either injected directly into the oil feed or into a slurry oil recycle stream (the highest boiling fraction of cracked products, generally containing dispersed catalyst fines) which is then combined with fresh oil feed. The cracking catalyst comes in contact with the oil feed in the cracking zone where $Li_2SO_4$ and, if present, other passivating agents are absorbed by and incorporated into the catalyst, thus providing a passivated catalyst in the cracking zone.

The employed concentrations of the passivating solutions (or dispersions) and their injection rates are dependent on the metal contaminant content of the feed, but are generally chosen such that at least about 0.01 weight-% Li and, optionally, at least about 0.01 weight-% of Sb (or another passivating element), is incorporated into the catalyst in the cracking zone. Generally the passivated cracking catalyst, when it is present in the cracking zone after it has been brought into contact with the passivating agent(s), contains about 0.01 to about 5 weight-% (preferably about 0.02-1 weight-%) Li and, if used, about 0.01 to about 5 weight-% (preferably about 0.02-1 weight-%) Sb. Preferably, the concentration of added lithium (as sulfate) in the oil feed is about 0.1-5,000 ppm Li and the concentration of added antimony (on an elemental basis) in the oil feed is about 0.1-5,000 ppm Sb. In another (presently less preferred) embodiment, the passivating agent(s) can be injected directly into the catalytic cracking reactor, at such an amount and rate as to provide the above-recited levels of Li and, optionally, Sb in the catalyst. It is, of course, within the scope of this invention to add $Li_2SO_4$ compounds (other passivating compounds) to the oil feed and also employ a zeolite-containing cracking catalyst which already contains some Li and/or Sb and/or other passivating elements (because the catalyst is a "spent" or "equilibrium" catalyst which has previously undergone passivation). In this latter case, the amounts of $Li_2SO_4$ and, optionally, Sb compounds which are injected into the feed are adjusted such that the above-recited levels of Li and, optionally, Sb in the passivated catalyst in the cracking zone are attained.

In a further preferred embodiment, at least one passivating solution (or colloidal dispersion) described above is injected into the oxidative regenerator (described above) so that the liquid treating agent(s) come in contact with the hot spent catalyst. In this mode of operation, the thus-passivated catalyst substantially simultaneously dried and calcined. The liquid passivating agent(s) is injected into the regenerator at such a rate as to provide the above-specified levels of Li and, if used, Sb in the regenerated cracking catalyst composition. It is also within the scope of this invention to inject the liquid treating agent(s) into conduits transporting hot "spent" catalyst to or from the regenerator. The thus-treated regenerated catalytic cracking catalyst composition can then be recycled, optionally admixed with fresh (treated or untreated) cracking catalyst composition, to the catalytic cracking zone.

The following examples are presented to further illustrate this invention and are not to be considered as unduly limiting the scope of this invention.

EXAMPLE I

This example illustrates the treatment of a nickel-containing catalytic cracking catalyst with $Li_2SO_4$ and the use of the thus-treated catalysts for catalytic cracking.

Catalyst A (Control) was prepared as follows. A calcined, fresh, zeolite-containing cracking catalyst (a commercial catalyst containing a zeolite having a unit cell size of about 24.57 angstroms and a silica-alumina binder material; having a total surface area of about 265 $m^2/g$; supplied by the Davison Chemical Division of W. R. Grace and Company, Baltimore, Md.) was impregnated at room temperature with a solution of nickel 2-ethylhexanoate in toluene (containing about 12.7 weight-% Ni; provided by Mooney Chemicals, Cleveland, Ohio) such as to incorporate about 2,400 ppm Ni into the catalyst, followed by drying and calcining in air for 1-2 hours at 1250° F. The thus-treated catalyst simulates a used cracking catalyst having been contaminated with nickel.

Catalyst B (Invention) contained 1500 ppm (parts per million by weight) of Li and was prepared as follows. A sample of 50.0 grams of Catalyst A was impregnated with an aqueous solution of 0.691 grams of $Li_2SO_4.H_2O$ in 30 mL of distilled water. The thus-impregnated catalyst was dried, calcined in air for 1 hour at 1250° F., treated with 100% steam for 4 hours at 1425 ° F., and then heated in 12 sequential oxidation/reduction cycles, wherein each oxidation/reduction cycle was carried out as follows: heating the catalyst to 1300° F. in a nitrogen gas atmosphere over a period of 1.1 minute, maintaining this temperature for 3 minutes while passing nitrogen gas over the catalyst, heating the catalyst in an air stream at 1300° F. for 16 minutes, purging the catalyst with nitrogen gas at 1300° F. for 4 minutes, and cooling the catalyst to 900° F. over a period of about 4 minutes in a stream of a hydrogen/nitrogen gas mixture (having a $H_2:N_2$ volume ratio of 2:1).

Catalyst C (Control) contained 3600 ppm Sb and was prepared as follows. A sample of 50.0 grams of Catalyst A was impregnated with a mixture of 0.857 grams of Phil-Ad CA 3000 (a solution of antimony tris(2-hydroxyethylthiolate) in 2-hydroxyethanethiol containing about 21 weight-% Sb; provided by Catalyst Resources, Inc., Bayport, Tex.) and 30 mL acetone. The thus-impregnated catalyst was dried, calcined for 0.5 hour in air at 1250° F., treated for 4 hours with 100% steam at 1425° F., and then heated in 50 sequential oxidation/reduction cycles (described for Catalyst B).

Catalyst D (Invention) contained 3600 ppm Sb and 1500 ppm Li and was prepared as follows. A sample of 50.0 grams of Catalyst A was impregnated with a mixture of 0.857 grams of Phil-Ad CA 3000 (described above) and 300 mL acetone, dried, impregnated with a solution of 0.691 grams of $Li_2SO_4.H_2O$ in 30 mL of distilled water, dried again, calcined in air for 1 hour at 1250° F., treated with 100% steam for 4 hours at 1425° F., and then heated in 17 sequential oxidation/reduction cycles (described for Catalyst B).

Catalyst A-D were then evaluated in a laboratory MAT cracking test apparatus, substantially as described in ASTM Method D3907, employing a hydrotreated crude oil feed containing about 5 weight-% Conradson carbon, about 0.6 weight-% sulfur, about 0.2 weight-% nitrogen, about 0.7 weight-% n-pentane insolubles, about 5 ppm Ni and about 7 ppm V. The MAT tests were carried out at a catalyst:oil weight ratio of about 3:1, a reaction temperature of 950° F., a reaction time of 75 seconds, a steam-stripping cycle of 10 minutes, and a regeneration cycle of 30 minutes at a temperature of 1250° F. Pertinent test results (averages of two measurements) are summarized in Table I.

TABLE I

| Catalyst | Catalyst Additive | % Feed Conversion | % Gasoline Yield | % Light Cycle Oil Yield | % Heavy Cycle Oil Yield | % Coke Yield | $H_2$ Yield (SCF/BF)[1] | % $C_1-C_4$[2] Yield |
|---|---|---|---|---|---|---|---|---|
| A (Control) | — | 79.6 | 51.4 | 14.2 | 6.2 | 13.2 | 273 | 14.8 |
| B (Invention) | 1500 ppm Li | 77.6 | 52.0 | 15.3 | 7.6 | 12.1 | 242 | 13.4 |
| C (Control) | 3600 ppm Sb | 76.6 | 53.3 | 15.9 | 7.6 | 11.1 | 253 | 12.3 |
| D (Invention) | 3600 ppm Sb + 1500 ppm Li | 75.9 | 54.5 | 16.0 | 8.2 | 9.8 | 211 | 11.5 |

[1]Standard cubic feet $H_2$ per barrel feed oil
[2]Yields of individual $C_1-C_4$ hydrocarbons were: 0.9-1.1% methane, 0.6-0.8% ethylene, 0.7-0.9% ethane, 3.0-3.4% propylene, 0.9-1.5% propylane, 2.0-2.3% butenes, 2.4-3.6% isobutane, and 0.6-0.9% n-butane
Note:
All % yields were calculated as follows: weight of individual product (per hour) divided by weight of converted feed (per hour) times 100.

Test data summarized in Table I demonstrate the effectiveness of the passivation of a nickel-contaminated catalytic cracking catalyst with $Li_2SO_4$. A comparison of the results for the first two test runs reveals that the $Li_2SO_4$-passivated Catalyst B produced more of desirable liquid products (gasoline, light cycle oil) and less of gaseous products ($H_2$, $C_1-C_4$ hydrocarbons). These beneficial results were even more pronounced when the Ni-containing catalyst was passivated with $Li_2SO_4$ and also an antimony compound.

EXAMPLE II

This examples illustrates the treatment of a nickel/vanadium-contaminated FCC equilibrium cracking catalyst with lithium sulfate, and the use of the thus-treated catalysts for catalytic cracking. This example also demonstrates that passivation with $Li_2SO_4$ was more effective than passivation with an organic lithium compound (which is easily converted to lithium oxide).

Catalyst E (Control) was a regenerated equilibrium cracking catalyst obtained from a FCC unit of a refinery of Phillips Petroleum Company. This catalyst contained about 44 weight-% zeolite having a unit cell size of 24.29 angstroms and about 56 weight-% silica-alumina binder material, had a total surface area of 171 m$^2$/g, and contained about 800 ppm Ni and about 900 ppm V as impurities (from the previous use in a commercial catalytic cracking operation).

Catalyst F (Control) contained 1000 ppm Li and was prepared by impregnating a sample of 50.0 grams of Catalyst E with 3.6 mL of a 2 molar solution of n-butyllithium in cyclohexane. The thus-impregnated catalyst was dried and heated in 39 sequential oxidation/reduction cycles (described for Catalyst B).

Catalyst G (Invention) also contained 1000 ppm Li but was prepared by impregnation of 50 grams of Catalyst E with a solution of 0.4608 grams of $Li_2SO_4 \cdot H_2O$ in 30 mL of distilled water, followed by drying and heating in 24 sequential oxidation/reduction cycles (described for Catalyst B).

Catalyst H (Control) contained 400 ppm Sb and was prepared by impregnation of 50.0 grams of Catalyst E with a mixture of 0.0952 grams of Phil-Ad CA 3000 (described above), followed by drying and heating in 11 sequential oxidation/reduction cycles (described for Catalyst B).

Catalyst I (Invention) contained 400 ppm Sb and 1000 ppm Li, and was prepared as follows. A sample of 50.0 grams of Catalyst E was impregnated with a mixture of 0.0952 grams of Phil-Ad CA 3000 (described above) and 30 mL acetone, dried, impregnated with a solution of 0.4608 grams of $Li_2SO_4 \cdot H_2O$ in 30 mL of distilled water, dried, and heated in 11 sequential oxidation/reduction cycles (described for Catalyst B).

Catalysts E-I were evaluated in a MAT cracking test apparatus, according to the procedure described in Example I. Pertinent test results (averages of two measurements) are summarized in Table II.

yield and significantly lower coke and $H_2$ yields were attained by passivation with $Li_2SO_4$ and additionally an antimony compound.

Reasonable variations and modifications which will be apparent to those skilled in the art, can be made within the scope of the disclosure and appended claims without departing from the scope of this invention.

That which is claimed is:

1. A method for passivating a zeolite-containing catalytic cracking catalyst which contains at least one metal contaminant comprising contacting said catalyst with lithium sulfate, wherein said contacting is carried out at such conditions as to incorporate at least about 0.01 weight percent of lithium into said catalyst and to provide a passivated catalyst, and calcining the thus obtained passivated catalyst at a temperature of about 500°–800° C.

2. A method in accordance with claim 1, wherein said at east one metal contaminant comprises nickel compounds and vanadium compounds, and said catalyst contains at least one zeolite embedded in a silica-alumina matrix material.

3. A method in accordance with claim 2, wherein said contacting is carried out at such conditions as to provide a level of about 0.01–5 weight percent Li in said passivated catalyst.

4. A method in accordance with claim 2, wherein said catalyst is contacted with lithium sulfate and at least one compound of at least one element selected from the group consisting of alkaline earth metals, aluminum, indium, germanium, tin, phosphorus, antimony, bismuth, selenium, tellurium, zirconium, tungsten and manganese.

5. A method in accordance with claim 2, wherein said catalyst is contacted with lithium sulfate and additionally with at least one antimony compound.

6. A method in accordance with claim 5, wherein said contacting is carried out at such conditions as to provide a level of at least about 0.01 weight-% Sb in said passivated catalyst.

7. A method in accordance with claim 6, wherein said contacting is carried out at such conditions as to pro-

TABLE II

| Catalyst | Catalyst Additive | % Feed Conversion | % Gasoline Yield | % Light Cycle Oil Yield | % Heavy Cycle Oil Yield | % Coke Yield | H$_2$ Yield (SCF/BF)[1] | % C$_1$–C$_4$[2] Yield |
|---|---|---|---|---|---|---|---|---|
| E (Control) | — | 73.2 | 47.6 | 18.2 | 8.7 | 12.4 | 368 | 13.2 |
| F (Control) | 1000 ppm Li[3] | 70.9 | 47.5 | 19.3 | 9.8 | 11.8 | 355 | 11.7 |
| G (Invention) | 1000 ppm Li[4] | 72.7 | 49.4 | 18.8 | 8.8 | 11.3 | 354 | 11.9 |
| H (Control) | 400 ppm Sb | 74.5 | 50.1 | 17.7 | 7.8 | 11.9 | 352 | 12.5 |
| I (Invention) | 400 ppm Sb + 1000 ppm Li[4] | 73.0 | 50.1 | 18.3 | 8.7 | 10.9 | 337 | 12.0 |

[1]Standard cubic feet H$_2$ per barrel feed oil
[2]Yields of individual C$_1$–C$_4$ hydrocarbons were: 1.2–1.3% methane, 0.5–0.7% ethylene, 0.8–0.9% ethane, 3.0–3.4% propylene, 0–0.9% propane, 2.7–3.0% butenes, 1.7–2.2% isobutane, and 0.5–0.6% n-butane
[3]applied as n-butyllithium
[4]applied as Li$_2$SO$_4$
Note:
All % yields were calculated as follows: weight of individual product (per hour) divided by weight of converted feed (per hour) times 100.

Test results in Table II clearly show the unexpected superiority of passivation of a Ni/V-Contaminated cracking catalyst with lithium sulfate (Catalyst G) over passivation with n-butyllithium (Catalyst F): to higher feed conversion, higher gasoline yield, lower coke yield and lower hydrogen generation. A comparision of the results obtained for Catalyst I with those obtained for Catalyst G shows that a significantly higher gasoline vide a level of about 0.01–5 weight-% Li and a level of about 0.01–5 weight-% Sb in said passivated catalyst.

8. A method in accordance with claim 5, wherein said at least one antimony compound is antimony tris(2-hydroxyethylthiolate).

9. A method in accordance with claim 1, further comprising drying the catalyst having been contacted with lithium sulfate before said calcining, wherein said calcining is carried out for about 0.5–8 hours.

10. A method in accordance with claim 1, wherein said contacting is carried out with a hot catalyst in an oxidative regenerator.

11. A passivated zeolite-containing catalytic cracking catalyst obtained by the method of claim 1.

12. A passivated catalytic cracking catalyst obtained by the method of claim 3.

13. A passivated catalytic cracking catalyst obtained by the method of claim 4.

14. A passivated catalytic cracking catalyst obtained by the method of claim 7.

15. A process for catalytically cracking a hydrocarbon-containing oil feed in the substantial absence of added hydrogen gas, at a temperature of about 800°–1200° F., in the presence of a passivated catalytic cracking catalyst which has been obtained by the method of claim 1.

16. A process in accordance with claim 15, wherein said passivated catalytic cracking catalyst has been obtained by the method of claim 3.

17. A process in accordance with claim 15, wherein said passivated catalytic cracking catalyst has been obtained by the method of claim 4.

18. A process in accordance with claim 15, wherein said passivated catalytic cracking catalyst has been obtained by the method of claim 7.

19. A process in accordance with claim 15, wherein said hydrocarbon-containing oil feed has a boiling range, measured at atmospheric pressure conditions, of about 400° F. to about 1200° F. and contains in excess of about 0.01 ppm nickel and in excess of about 0.01 ppm vanadium.

20. A process for catalytically cracking a hydrocarbon-containing oil feed in the substantial absence of added hydrogen gas and in the presence of a zeolite-containing catalytic cracking catalyst in a catalytic cracking zone, at a temperature of about 800°–1200° F., wherein lithium sulfate has been added to said oil feed at such conditions as to incorporate at least about 0.01 weight-% lithium into said catalyst and to provide a passivated catalyst in said cracking zone.

21. A process in accordance with claim 20, wherein said catalyst comprises at least one zeolite embedded in a silica-alumina matrix and contains compounds of nickel and of vanadium as impurities.

22. A process in accordance with claim 21, wherein about 0.01–5 weight-% Li has been incorporated into said catalyst.

23. A process in accordance with claim 21, wherein additionally at least one compound of at least one element selected from the group consisting of alkaline earth metals, aluminum, indium, germanium, tin, phosphorus, antimony, bismuth, selenium, tellurium, zirconium, tungsten and manganese has been added to said oil yield.

24. A process in accordance with claim 21, wherein additionally at least one antimony compound has been added to said oil feed.

25. A process in accordance with claim 24, wherein $Li_2SO_4$ and the at least one compound of antimony have been added to said oil feed in such amounts as to provide a level of about 0.01–5 weight-% Li and a level of about 0.01–5 weight-% Sb in said passivated catalyst in said cracking zone.

26. A process in accordance with claim 20, wherein said hydrocarbon-containing oil feed has a boiling range, measured at atmospheric pressure conditions, of about 400° F. to about 1200° F. and contains in excess of about 0.01 ppm nickel and in excess of about 0.01 ppm vanadium.

* * * * *